US006661626B2

(12) United States Patent
Gill

(10) Patent No.: US 6,661,626 B2
(45) Date of Patent: Dec. 9, 2003

(54) TUNNEL VALVE SENSOR HAVING A PINNED LAYER STRUCTURE WITH AN IRON OXIDE ($FE^3O^4$) LAYER

(75) Inventor: Hardayal Singh Gill, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 09/813,855

(22) Filed: Mar. 20, 2001

(65) Prior Publication Data
US 2002/0135923 A1 Sep. 26, 2002

(51) Int. Cl.[7] .............................................. G11B 5/127
(52) U.S. Cl. .................................. 360/324.2; 360/73.03
(58) Field of Search ..................... 360/324.2, 324.12, 360/324.11, 73.03; 428/682

(56) References Cited

U.S. PATENT DOCUMENTS

| | | | |
|---|---|---|---|
| 5,695,864 A | 12/1997 | Slonczewski | 428/212 |
| 5,712,612 A | 1/1998 | Lee et al. | 338/32 |
| 5,757,056 A | 5/1998 | Chui | 257/421 |
| 5,841,692 A | 11/1998 | Gallagher et al. | 365/173 |
| 5,923,504 A | 7/1999 | Araki et al. | 360/113 |
| 5,930,087 A | 7/1999 | Brug et al. | 360/113 |
| 5,936,402 A | 8/1999 | Schep et al. | 324/252 |
| 5,966,012 A | 10/1999 | Parkin | 324/252 |
| 5,986,858 A | 11/1999 | Sato et al. | 360/113 |
| 6,054,226 A | * 4/2000 | Takeda et al. | 428/682 |
| 6,303,218 B1 | * 10/2001 | Kamiguchi et al. | 428/332 |
| 6,400,536 B1 | * 6/2002 | Gill | 360/324.12 |
| 6,504,690 B2 | * 1/2003 | Komuro et al. | 360/324.2 |

FOREIGN PATENT DOCUMENTS

| | | | |
|---|---|---|---|
| JP | 11097766 | 4/1999 | H01L/43/08 |
| JP | 11177161 | 7/1999 | H01L/43/08 |
| JP | 11238924 | 8/1999 | H01L/43/08 |
| JP | 11238925 | 8/1999 | H01L/43/08 |
| WO | WO 95/10123 | 4/1995 | H01L/43/08 |

OTHER PUBLICATIONS

*IBM Tech. Discl. Bulletin*, 40/4, Apr. 1997, "Spin Valve Head with Series Connected Current."
*IBM Tech. Discl. Bulletin*, 40/4, Apr. 1997, "Spin Valve Head with Fe/Al2O3/Fe/FiFe . . .".
*Applied Physics Letters*, 72/10, May 1998, "Assisted tunneling in ferromagnetic junctions . . .".
*Journal/Mag.&Mag.Mat'ls* 200, 1999, 248–272, "Spin polarized tunneling in ferromagnetic . . .".

* cited by examiner

*Primary Examiner*—David Hudspeth
*Assistant Examiner*—K. Wong
(74) *Attorney, Agent, or Firm*—Ervin F. Johnston

(57) ABSTRACT

In a tunnel junction sensor a free layer structure has a cobalt iron ($Co_{90}Fe_{10}$) layer and a half metallic iron oxide ($Fe_3O_4$) layer and a pinned layer structure has a cobalt iron ($Co_{50}Fe_{50}$) layer and a half metallic iron oxide ($Fe_3O_4$) layer. Each of the iron oxide layers interfaces a barrier layer which is compatible therewith. The thicknesses of the iron oxide ($Fe_3O_4$) layers are less than the thicknesses of the other layers of the free and pinned layer structures.

25 Claims, 5 Drawing Sheets

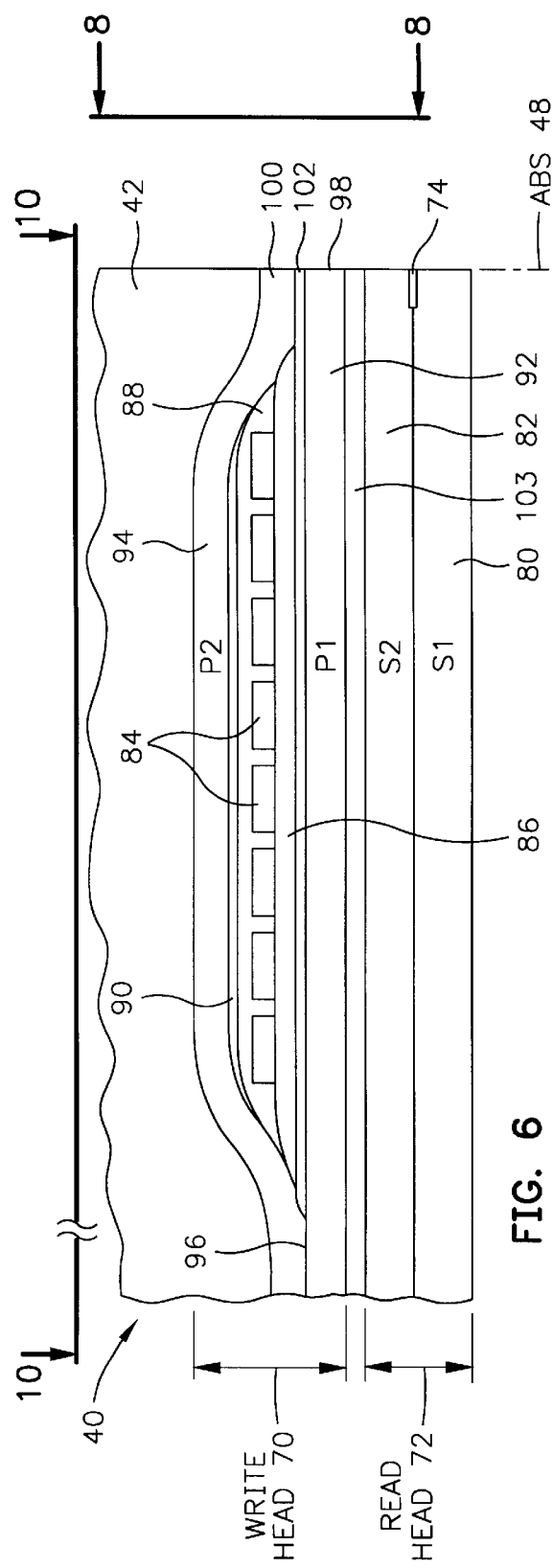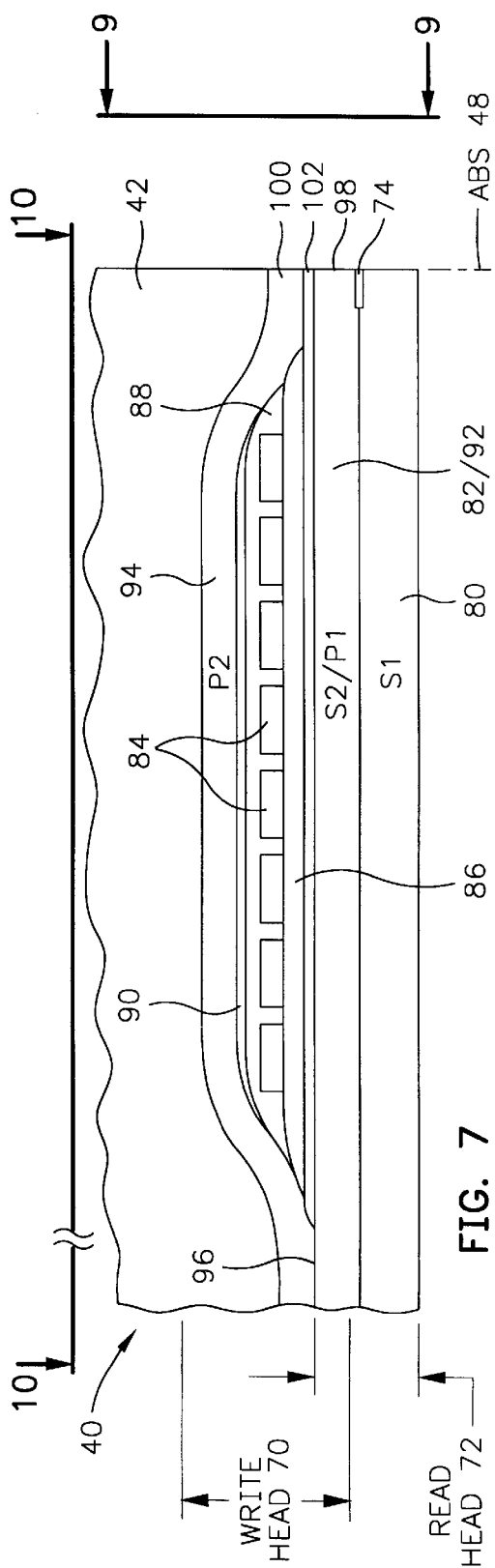

TUNNEL VALVE SENSOR HAVING A PINNED LAYER STRUCTURE WITH AN IRON OXIDE ($FE^3O^4$) LAYER

BACKGROUND OF THE INVENTION

1. Field of the Invention

The present invention relates to a tunnel valve sensor having a pinned layer structure with an iron oxide ($Fe_3O_4$) layer and, more particularly, to such a sensor wherein the highly polarized iron oxide ($Fe_3O_4$) layer improves the magnetoresistive coefficient dr/R of the spin valve sensor.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a tunnel junction sensor for sensing the magnetic signal fields from the rotating magnetic disk. The sensor includes an insulative tunneling or barrier layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. The tunnel junction sensor is located between ferromagnetic first and second shield layers. First and second leads, which may be the first and second shield layers, are connected to the tunnel junction sensor for conducting a sense current therethrough. The sense current is conducted perpendicular to the major film planes (CPP) of the sensor as contrasted to a spin valve sensor where the sense current is conducted parallel to or in the major film planes (CIP) of the spin valve sensor. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is parallel to the ABS, occurs when the sense current is conducted through the sensor without magnetic field signals from the rotating magnetic disk.

When the magnetic moments of the pinned and free layers are parallel with respect to one another the resistance of the tunnel junction sensor to the sense current ($I_S$) is at a minimum and when their magnetic moments are antiparallel the resistance of the tunnel junction sensor to the sense current ($I_S$) is at a maximum. Changes in resistance of the tunnel junction sensor is a function of cos θ, where θ is the angle between the magnetic moments of the pinned and free layers. When the sense current ($I_S$) is conducted through the tunnel junction sensor resistance changes, due to signal fields from the rotating magnetic disk, cause potential changes that are detected and processed as playback signals. The sensitivity of the tunnel junction sensor is quantified as magnetoresistive coefficient dr/R where dr is the change in resistance of the tunnel junction sensor from minimum resistance (magnetic moments of free and pinned layers parallel) to maximum resistance (magnetic moments of the free and pinned layers antiparallel) and R is the resistance of the tunnel junction sensor at minimum resistance. The dr/R of a tunnel junction sensor can be on the order of 40% as compared to 10% for a spin valve sensor.

The first and second shield layers may engage the bottom and the top respectively of the tunnel junction sensor so that the first and second shield layers serve as leads for conducting the sense current $I_S$ through the tunnel junction sensor perpendicular to the major planes of the layers of the tunnel junction sensor. The tunnel junction sensor has first and second side surfaces which are normal to the ABS. First and second hard bias layers abut the first and second side surfaces respectively for longitudinally biasing the magnetic domains of the free layer. This longitudinal biasing maintains the magnetic moment of the free layer parallel to the ABS when the read head is in the quiescent condition.

SUMMARY OF THE INVENTION

The present invention increases the magnetoresistive coefficient dr/R of the tunnel sensor by providing the free layer structure with a cobalt iron (CoFe) layer and a half-metallic iron oxide ($Fe_3O_4$) layer, and providing the pinned layer structure with a cobalt iron (CoFe) layer and a half-metallic iron oxide ($Fe_3O_4$) layer. The half-metallic iron oxide ($Fe_3O_4$) layer in each of the free and pinned layer structures is highly polarized so that sense current electrons of only one spin are permitted to tunnel therethrough while sense current electrons of the opposite spin are prevented from tunneling. Accordingly, the magnetoresistance dr of the tunnel junction sensor, which is the resistance difference of a sensor between parallel and antiparallel relationships of the free and pinned layer structures, is significantly improved. The iron oxide ($Fe_3O_4$) highly discriminates between the spins of the sense current electrons as they tunnel therethrough.

The invention also employs cobalt iron (CoFe) in each of the pinned and free layer structures for different purposes. The cobalt iron (CoFe) layer employed in the pinned layer structure is located between the iron oxide ($Fe_3O_4$) layer and the pinning layer so that the oxide of the iron oxide ($Fe_3O_4$) layer does not degrade the microstructure of the pinning layer. Further, the cobalt iron (CoFe) layer in the pinned layer structure is $Co_{50}Fe_{50}$ which has a high positive magnetostriction. After constructing the head the positive magnetostriction causes a stress-induced anisotropy which supports the exchange coupling between the pinning layer and the cobalt iron ($Co_{50}Fe_{50}$) layer. The iron oxide ($Fe_3O_4$) layer in the pinned layer structure interfaces the barrier layer which is also an oxide layer and is compatible therewith. The cobalt iron (CoFe) layer of the free layer structure is preferably $Co_{90}Fe_{10}$ which has significantly lower magnetostriction and sufficient magnetic softness to counterbalance high coercivity of the iron oxide ($Fe_3O_4$) layer in the free layer structure. The iron oxide ($Fe_3O_4$) layer in the free layer structure also interfaces the barrier layer which is compatible therewith and is located between the barrier layer and the cobalt iron ($Co_{90}Fe_{10}$) layer. Additional information on spin polarized tunneling in ferromagnetic junctions can be found in the *Journal of Magnetism and Magnetic Materials* 200 (1999) 248–273 which is incorporated by reference herein.

An object of the present invention is to increase the magnetoresistance of a tunnel junction sensor.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
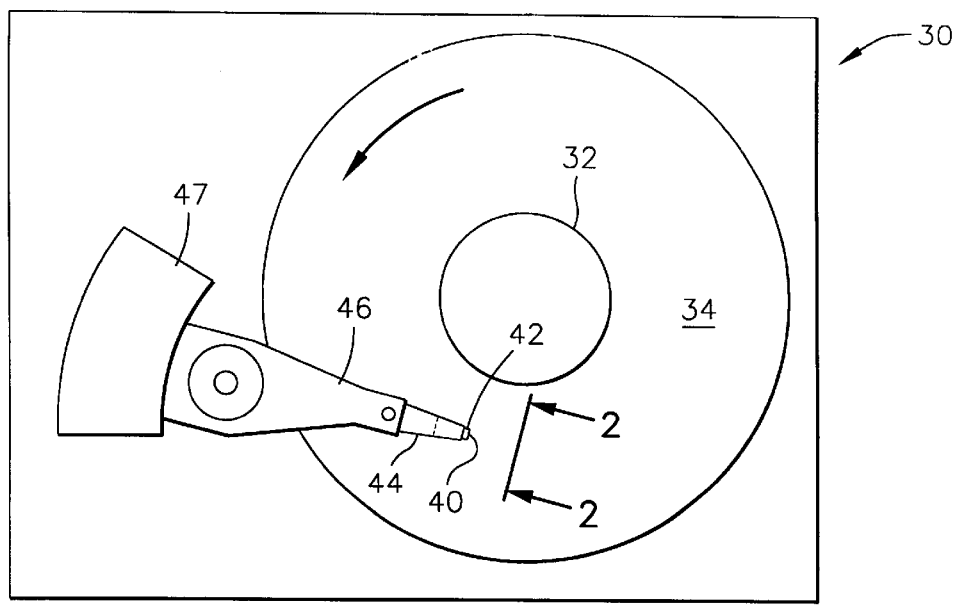
FIG. 1 is a plan view of an exemplary magnetic disk drive.
Figure 2:
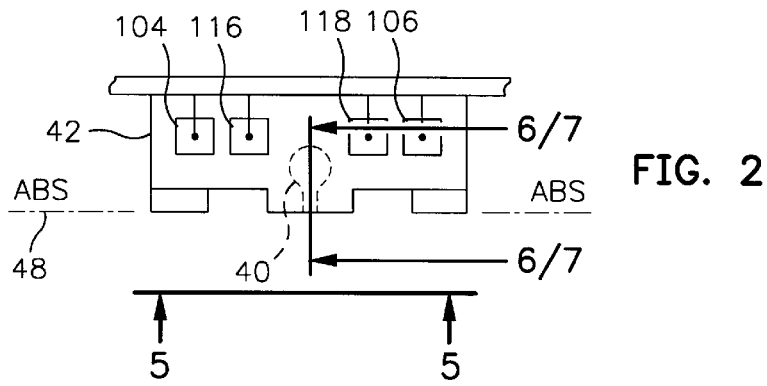
FIG. 2 is an end view of a slider with a magnetic head of the disk drive as seen in plane 2—2 of FIG. 1.
Figure 3:
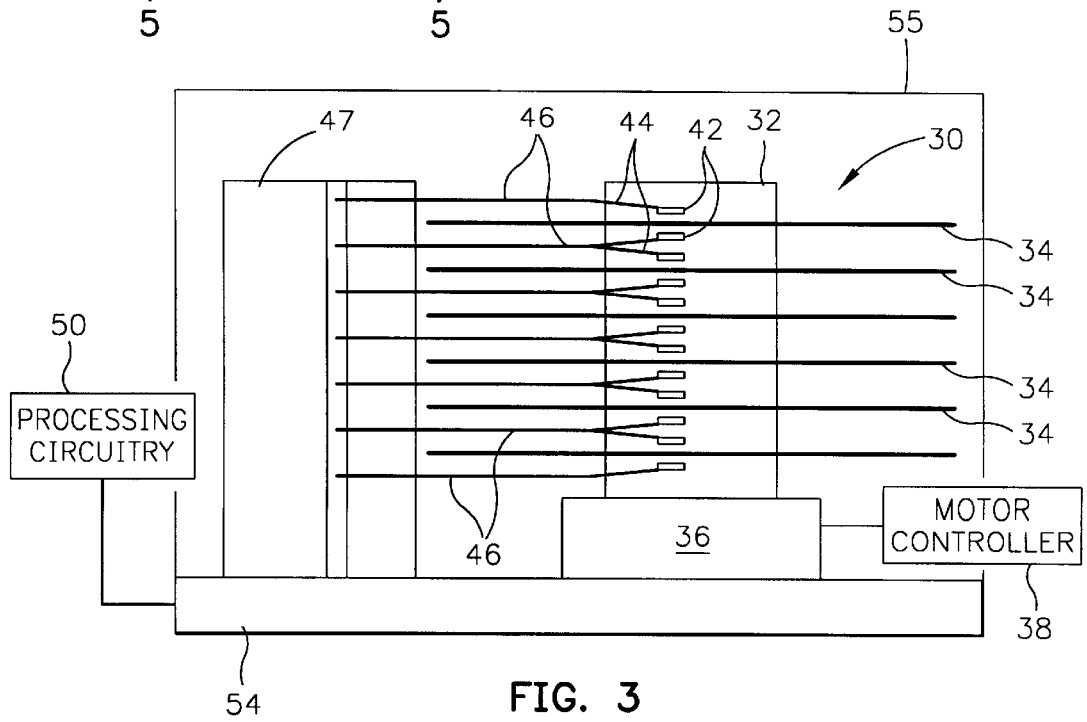
FIG. 3 is an elevation view of the magnetic disk drive wherein multiple disks and magnetic heads are employed.
Figure 4:
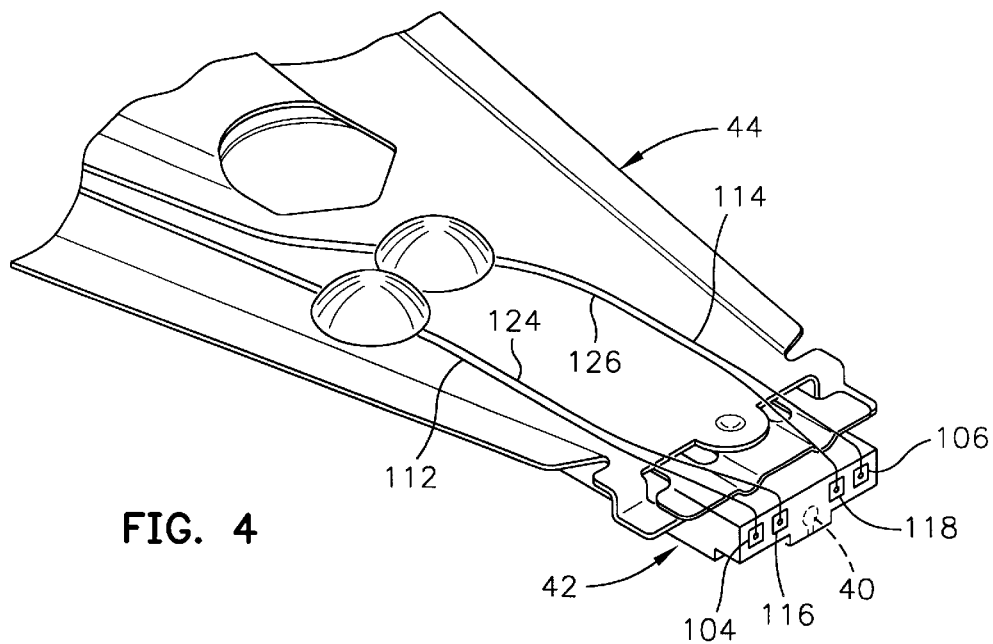
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates one or more magnetic disks 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
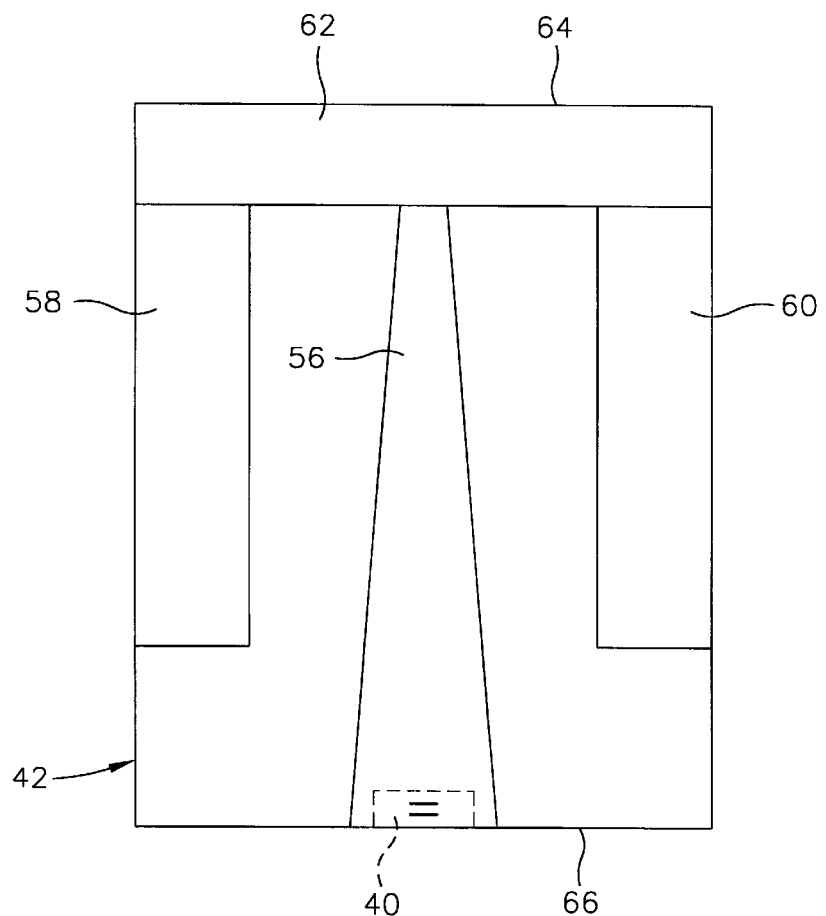
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
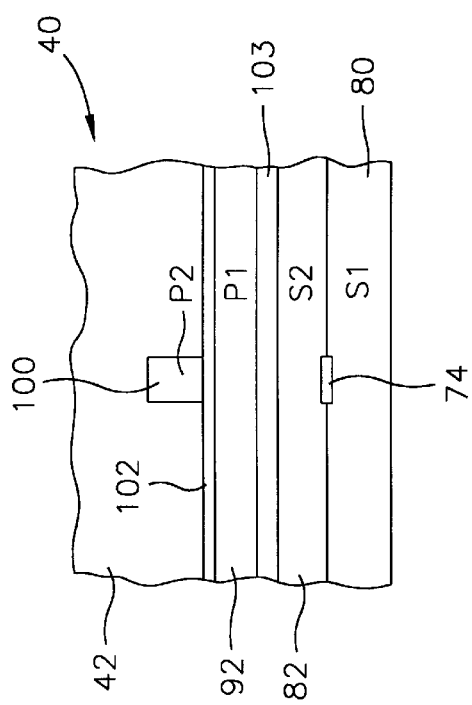
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a tunnel junction sensor 74 of the present invention. FIG. 8 is an ABS view of FIG. 6. The tunnel junction sensor 74 is sandwiched between ferromagnetic first and second shield layers 80 and 82. In response to external magnetic fields, the resistance of the spin valve sensor 74 changes. A tunneling current ($I_T$) conducted through the sensor causes these resistance changes to be manifested as potential changes. These potential changes are then processed as readback signals by the processing circuitry 50 shown in FIG. 3. The tunneling current ($I_T$) may be conducted through the tunnel junction sensor 74 perpendicular to the planes of its major film surfaces by the first and second shield layers 80 and 82 which serve as first and second leads.

Figure 10:
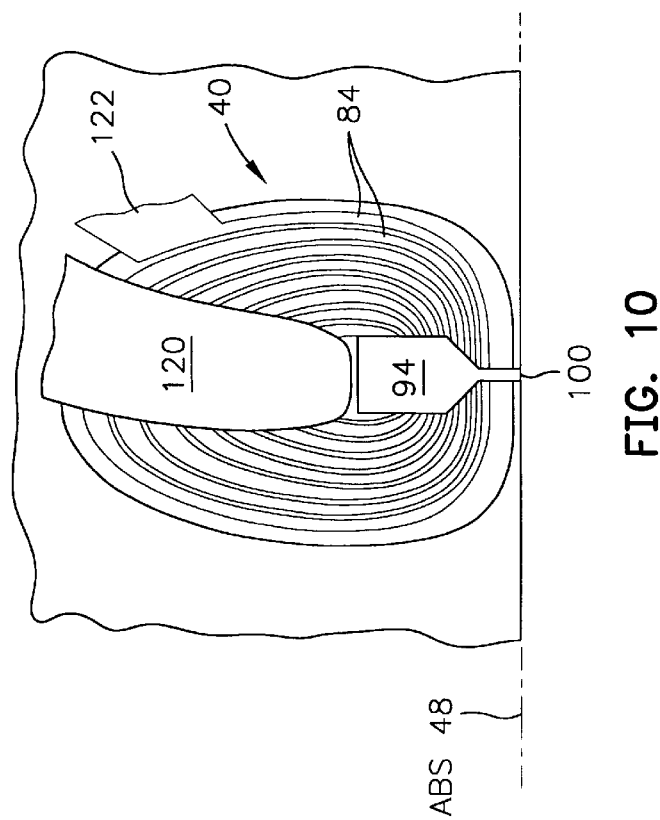
FIG. 10 is a view taken along plane 10—10 of FIG. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
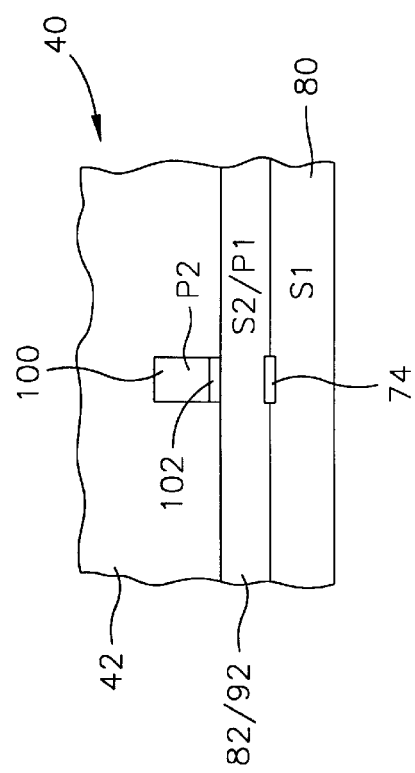
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
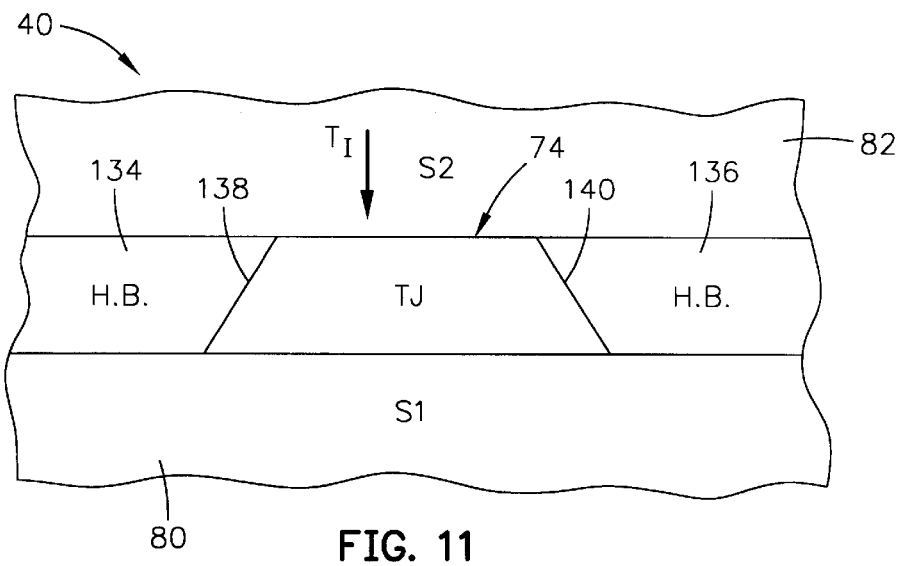
FIG. 11 is an enlarged ABS illustration of the tunnel junction read head.

FIG. 11 is an isometric ABS illustration of the read head 40 shown in FIG. 8 or 9. The read head 40 includes the tunnel junction sensor 74. First and second hard bias layers 134 and 136 are connected to first and second side edges 138 and 140 of the sensor. This connection is known in the art as a contiguous junction and is fully described in commonly assigned U.S. Pat. No. 5,018,037 which is incorporated by reference herein. The hard bias layers 134 and 136 cause magnetic fields to extend longitudinally through the sensor 74 for stabilizing the magnetic domains therein. The sensor 74 and the first and second hard bias layers 134 and 136 are located between ferromagnetic first and second shield layers 80 and 82 which may serve as leads for conducting the tunneling current $I_T$ through the sensor 74.

Figure 12:
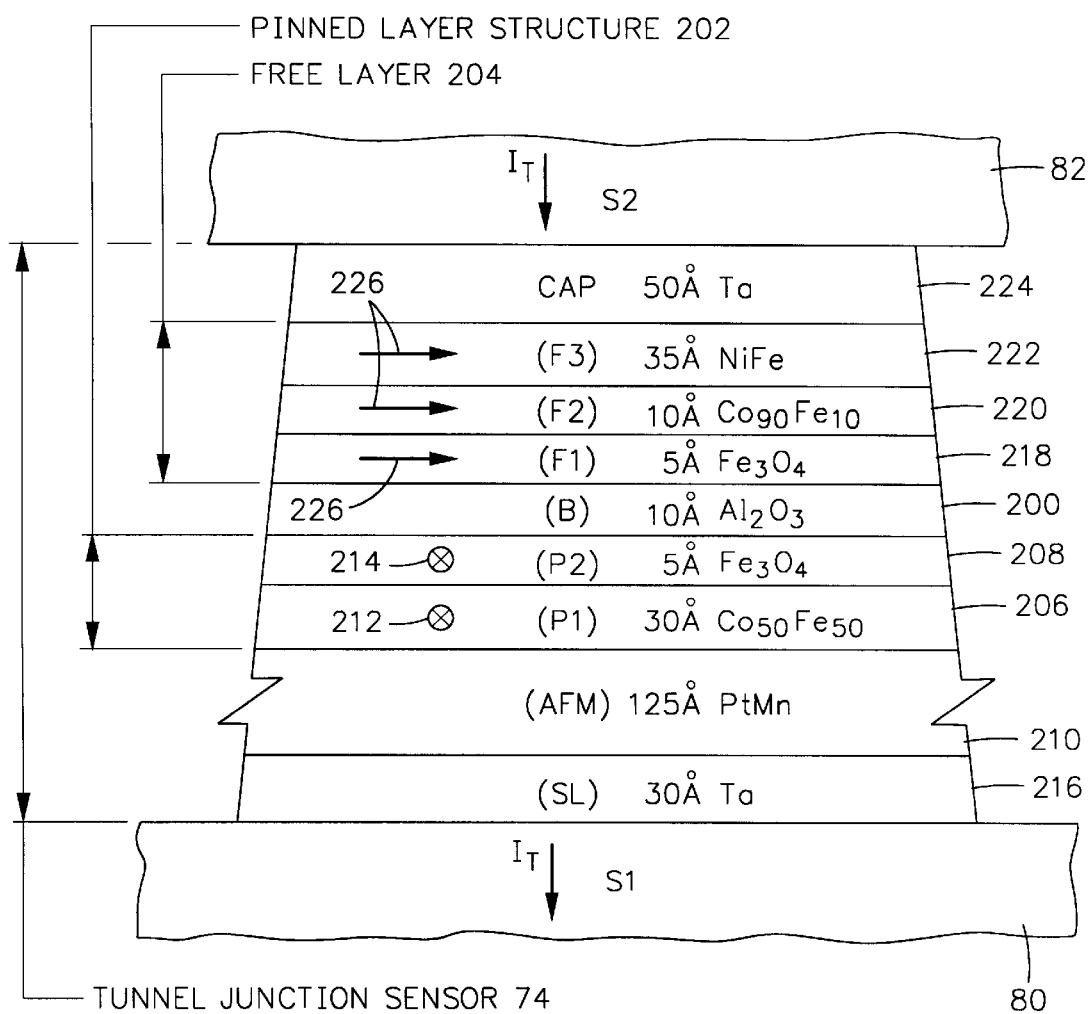
FIG. 12 is an enlarged ABS illustration of the present tunnel junction sensor.

FIG. 12 is an enlarged ABS illustration of the present tunnel junction sensor 74 which is located between the first and second shield layers 80 and 82. The tunnel junction sensor 74 includes a barrier layer (B) 200 which is located between a pinned layer structure 202 and a free layer structure 204. The pinned layer structure 202 includes a first pinned layer (P1) 206 and a second pinned layer (P2) 208. The first pinned layer 206 is exchange coupled to an antiferromagnetic (AFM) pinning layer 210 for pinning a magnetic moment 212 of the first pinned layer 206 perpendicular to the ABS, either in a direction out of the head or into the head, as shown in FIG. 12. The magnetic moment 212 of the first pinned layer 206 pins a magnetic moment 214 of the second pinned layer 208 parallel thereto. The first pinned layer 206 is preferably cobalt iron ($Co_{50}Fe_{50}$) which has a high magnetostriction so that after lapping the head the first pinned layer 206 has a stress-induced anisotropy perpendicular to the ABS which supports the exchange coupling between the pinning layer 210 and the first pinned layer 206. The second pinned layer 208 is composed of half metallic iron oxide ($Fe_3O_4$) which is highly spin-polarized so that it allows tunnel current electrons of only one polarity to tunnel therethrough and to prevent tunnel current electrons of opposite polarity from tunneling therethrough. This high spin polarization of the second pinned layer 208 significantly increases the magnetoresistive coefficient dr/R of the spin valve sensor. An aspect of the invention is that the second pinned layer 208 interfaces the barrier layer 200 since they are both oxides and are compatible instead of the second pinned layer 208 interfacing the pinning layer 210 which would cause degradation of the pinning layer 210. A seed layer of tantalum (Ta) 216 may be located between the pinning layer 210 and the first shield layer 80 for improving the microstructure of the layers of the tunnel junction sensor deposited thereon.

The free layer structure 204 includes a first free layer (F1) 218 and a second free layer (F2) 220. The first free layer 218 is half metallic iron oxide ($Fe_3O_4$) which interfaces the barrier layer 200. Since both of these layers are an oxide they are compatible with each other. Another aspect of the invention is that the second free layer 220 is cobalt iron ($Co_{90}Fe_{10}$) which has a low magnetostriction and has a sufficiently high magnetic softness for improving the performance of the free layer structure 204. However, a third free layer (F3) 222 is preferably employed with a composition of nickel iron (NiFe) which further increases the magnetic softness of the free layer structure 204. A cap layer 224 of tantalum (Ta) may be employed between the third free layer 222 and the second shield layer 82 for protecting the free layer structure from subsequent processing steps. The free layer structure 204 has a magnetic moment 226 which is directed from right to left or from left to right, as shown in FIG. 12. When a field signal from the rotating magnetic disk rotates the magnetic moment 226 of the free layer structure into the head the magnetic moments 226, as compared to the magnetic moments 212 and 214, become more parallel which reduces the magnetoresistive coefficient dr/R of the head and when the field signal rotates the magnetic moments 226 out of the head the magnetic moments 226, as compared to the magnetic moments 212 and 214, become more antiparallel which increases the magnetoresistive coefficient dr/R of the head. These increases and decreases in the resistance of the head are processed as playback signals by the processing circuitry 50 in FIG. 3.

Exemplary thicknesses of the layers are 30 Å of tantalum (Ta) for the seed layer (SL) 216, 125 Å of platinum manganese (PtMn) for the pinning layer 210, 30 Å of cobalt iron ($Co_{50}Fe_{50}$) for the first pinned layer 206, 5 Å of iron oxide ($Fe_3O_4$) for the second pinned layer 208, 10 Å of aluminum oxide ($Al_2O_3$) for the barrier layer, 5 Å of iron oxide ($Fe_3O_4$) for the first free layer 218, 10 Å of cobalt iron ($Co_{90}Fe_{10}$) for the second free layer 220, 35 Å of nickel iron (NiFe) for the third free layer 222 and 50 Å of tantalum (Ta) for the cap layer 224.

An aspect of the invention is that the first free layer 218 be provided with a minimal thickness, preferably 5 Å, so as to minimize the coercivity of the free layer structure. Accordingly, the thickness of the first free layer 218 is less than the thickness of the second free layer 220 with the thickness of the second free layer 220 being 10 Å. Further, the thickness of the third free layer 222 is preferably thicker than the second free layer 220 for improving the magnetic softness of the free layer structure 204.

Discussion

It should be understood that the thicknesses and materials of the layers are exemplary. The platinum manganese is preferably $Pt_{50}Mn_{50}$ and the nickel iron is preferably $Ni_{83}Fe_{17}$. It should be understood that cobalt may be substituted for the cobalt iron and nickel manganese or iridium manganese may be substituted for the platinum manganese.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head which has an air bearing surface (ABS), comprising:
   a tunnel junction sensor including:
      a ferromagnetic pinned layer structure that has a magnetic moment;
      an antiferromagnetic pinning layer exchange coupled to the pinned layer structure for pinning the magnetic moment of the pinned layer structure;
      a ferromagnetic free layer structure which has a magnetic moment;
      a nonmagnetic electrically insulative barrier layer located between the free layer structure and the pinned layer structure;
      the free layer structure having a cobalt iron (CoFe) layer and an iron oxide ($Fe_3O_4$) layer; and
      the pinned layer structure having a cobalt iron (CoFe) layer and an iron oxide ($Fe_3O_4$) layer.

2. A magnetic read head as claimed in claim 1 including:
   ferromagnetic first and second shield layers; and
   the tunnel junction sensor being located between the first and second shield layers.

3. A magnetic read head as claimed in claim 2 wherein the cobalt iron (CoFe) layer of the pinned layer structure interfaces the pinning layer and the iron oxide ($Fe_3O_4$) layer of the pinned layer structure interfaces the barrier layer.

4. A magnetic read head as claimed in claim 3 wherein the cobalt iron (CoFe) layer of the pinned layer structure is ($Co_{50}Fe_{50}$).

5. A magnetic read head as claimed in claim 4 wherein the iron oxide ($Fe_3O_4$) layer of the free layer structure interfaces the barrier layer and the cobalt iron (CoFe) layer of the free layer structure is ($Co_{90}Fe_{10}$).

6. A magnetic head assembly having an air bearing surface (ABS), comprising:
   a write head including:

ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
a read head including:
a first shield layer;
a tunnel junction sensor located between the first shield layer and the first pole piece layer;
the tunnel junction sensor including:
a ferromagnetic pinned layer structure that has a magnetic moment;
an antiferromagnetic pinning layer structure exchange coupled to the pinned layer structure for pinning the magnetic moment of the pinned layer structure;
a ferromagnetic free layer structure which has a magnetic moment; and
a nonmagnetic electrically insulative barrier layer located between the free layer structure and the pinned layer structure;
the free layer structure having a cobalt iron (CoFe) layer and an iron oxide ($Fe_3O_4$) layer; and
the pinned layer structure having a cobalt iron (CoFe) layer and an iron oxide ($Fe_3O_4$) layer.

7. A magnetic head assembly as claimed in claim 6 including:
a ferromagnetic second shield layer;
a nonmagnetic isolation layer located between the second shield layer and the first pole piece layer.

8. A magnetic head assembly as claimed in claim 6 wherein the cobalt iron (CoFe) layer of the pinned layer structure interfaces the pinning layer and the iron oxide ($Fe_3O_4$) layer of the pinned layer structure interfaces the barrier layer.

9. A magnetic head assembly as claimed in claim 8 wherein the cobalt iron (CoFe) layer of the pinned layer structure is ($Co_{50}Fe_{50}$).

10. A magnetic head assembly as claimed in claim 9 wherein the iron oxide ($Fe_3O_4$) layer of the free layer structure interfaces the barrier layer and the cobalt iron (CoFe) layer of the free layer structure is ($Co_{90}Fe_{10}$).

11. A magnetic disk drive including at least one magnetic head assembly that has an a write head, a read head and an air bearing surface (ABS) comprising:
the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
a first shield layer;
a tunnel junction sensor located between the first shield layer and the first pole piece layer;
the tunnel junction sensor including:
a ferromagnetic pinned layer structure that has a magnetic moment;
an antiferromagnetic pinning layer exchange coupled to the pinned layer structure for pinning the magnetic moment of the pinned layer structure;
a ferromagnetic free layer structure which has a magnetic moment;
a nonmagnetic electrically insulative barrier layer located between the free layer structure and the pinned layer structure;
the free layer structure having a cobalt iron (CoFe) layer and an iron oxide ($Fe_3O_4$) layer; and
the pinned layer structure having a cobalt iron (CoFe) layer and an iron oxide ($Fe_3O_4$) layer;
a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and
a processor connected to the magnetic head assembly, to the spindle motor and to the actuator for exchanging signals with the magnetic head assembly, for controlling movement of the magnetic disk and for controlling the position of the magnetic head assembly.

12. A magnetic disk drive as claimed in claim 11 including:
a ferromagnetic second shield layer;
a nonmagnetic isolation layer located between the second shield layer and the first pole piece layer.

13. A magnetic disk drive as claimed in claim 11 wherein the cobalt iron (CoFe) layer of the pinned layer structure interfaces the pinning layer and the iron oxide ($Fe_3O_4$) layer of the pinned layer structure interfaces the barrier layer.

14. A magnetic disk drive as claimed in claim 13 wherein the cobalt iron (CoFe) layer of the pinned layer structure is ($Co_{50}Fe_{50}$).

15. A magnetic disk drive as claimed in claim 14 wherein the iron oxide ($Fe_3O_4$) layer of the free layer structure interfaces the barrier layer and the cobalt iron (CoFe) layer of the free layer structure is ($Co_{90}Fe_{10}$).

16. A method of making a magnetic read head which has an air bearing surface (ABS), comprising the steps of:
making a tunnel junction sensor including the steps of:
forming a ferromagnetic pinned layer structure with a magnetic moment;
forming an antiferromagnetic pinning layer exchange coupled to the pinned layer structure for pinning the magnetic moment of the pinned layer structure;
forming a ferromagnetic free layer structure with a magnetic moment;
forming a nonmagnetic electrically insulative barrier layer between the free layer structure and the pinned layer structure;
forming the free layer structure with a cobalt iron (CoFe) layer and an iron oxide ($Fe_3O_4$) layer; and
forming the pinned layer structure with a cobalt iron (CoFe) layer and an iron oxide ($Fe_3O_4$) layer.

17. A method of making a magnetic read head as claimed in claim 16 including the steps of:
forming ferromagnetic first and second shield layers; and
forming the tunnel junction sensor between the first and second shield layers.

18. A method of making a magnetic read head as claimed in claim 17 wherein the cobalt iron (CoFe) layer of the pinned layer structure is formed to interface the pinning layer and the iron oxide ($Fe_3O_4$) layer of the pinned layer structure is formed to interface the barrier layer.

19. A method of making a magnetic read head as claimed in claim 18 wherein the cobalt iron (CoFe) layer of the pinned layer structure is formed of ($Co_{50}Fe_{50}$).

20. A method of making a magnetic read head as claimed in claim 19 wherein the iron oxide ($Fe_3O_4$) layer of the free layer structure is formed to interface the barrier layer and the cobalt iron (CoFe) layer of the free layer structure is formed of ($Co_{90}Fe_{10}$).

21. A method of making magnetic head assembly that has an air bearing surface (ABS), comprising the steps of:

making a write head including the steps of:
       forming ferromagnetic first and second pole piece layers in pole tip, yoke and back gap regions wherein the yoke region is located between the pole tip and back gap regions;
       forming a nonmagnetic nonconductive write gap layer between the first and second pole piece layers in the pole tip region;
       forming an insulation stack with at least one coil layer embedded therein between the first and second pole piece layers in the yoke region; and
       connecting the first and pole piece layers at said back gap region; and
   making a read head including the steps of:
       forming a first shield layer; and
       forming a tunnel junction sensor between the first shield layer and the first pole piece layer;
   a making of the tunnel junction sensor comprising the steps of:
       forming a ferromagnetic pinned layer structure with a magnetic moment;
       forming an antiferromagnetic pinning layer exchange coupled to the pinned layer structure for pinning the magnetic moment of the pinned layer structure;
       forming a ferromagnetic free layer structure with a magnetic moment;
       forming a nonmagnetic electrically insulative barrier layer located between the free layer structure and the pinned layer structure;
       forming the free layer structure with a cobalt iron (CoFe) layer and an iron oxide ($Fe_3O_4$) layer; and
       forming the pinned layer structure with a cobalt iron (CoFe) layer and an iron oxide ($Fe_3O_4$) layer.

22. A method of making a magnetic head assembly as claimed in claim 21 further including the steps of:

forming a ferromagnetic second shield layer;
   forming a nonmagnetic isolation layer between the second shield layer and the first pole piece layer.

23. A method of making a magnetic head assembly as claimed in claim 21 wherein the cobalt iron (CoFe) layer of the pinned layer structure is formed to interface the pinning layer and the iron oxide ($Fe_3O_4$) layer of the pinned layer structure is formed to interface the barrier layer.

24. A method of making a magnetic head assembly as claimed in claim 23 wherein the cobalt iron (CoFe) layer of the pinned layer structure is formed of ($Co_{50}Fe_{50}$).

25. A method of making a magnetic head assembly as claimed in claim 24 wherein the iron oxide ($Fe_3O_4$) layer of the free layer structure is formed to interface the barrier layer and the cobalt iron (CoFe) layer of the free layer structure is formed of ($Co_{90}Fe_{10}$).

* * * * *